United States Patent [19]

Ueno et al.

[11] Patent Number: 4,495,924
[45] Date of Patent: Jan. 29, 1985

[54] FUEL INJECTION CONTROL SYSTEM FOR A DIRECT INJECTION TYPE INTERNAL COMBUSTION ENGINE

[75] Inventors: Takashi Ueno, Yokosuka; Sadao Takase, Yokohama, both of Japan

[73] Assignee: Nissan Motor Company, Limited, Yokohama, Japan

[21] Appl. No.: 482,566

[22] Filed: Apr. 6, 1983

[30] Foreign Application Priority Data

Apr. 14, 1982 [JP] Japan .................................. 57-60989

[51] Int. Cl.³ .......................... F02B 3/00; F02M 51/00
[52] U.S. Cl. ..................................... 123/478; 123/475
[58] Field of Search ............... 123/478, 475, 438, 480, 123/486, 487

[56] References Cited

U.S. PATENT DOCUMENTS 3,855,973 12/1974 Scofield ............................... 123/475
3,941,100 3/1976 Bensch et al. ........................ 123/475
4,213,425 7/1980 Read ..................................... 123/478

FOREIGN PATENT DOCUMENTS 2243659 3/1974 Fed. Rep. of Germany ...... 123/475
2503108 7/1976 Fed. Rep. of Germany ...... 123/475

Primary Examiner—Raymond A. Nelli
Attorney, Agent, or Firm—Schwartz, Jeffery, Schwaab, Mack, Blumenthal & Koch

[57] ABSTRACT

A fuel injection control system for a direct injection type internal combustion engine having a plurality of fuel injection valves installed in respective combustion chambers. The fuel injection control system comprises: (a) a means for calculating start timing with respect to each engine stroke and duration of fuel injection through the respective fuel injection valves according to the engine operating condition; (b) a means for producing a plurality of pulse signals each having a period corresponding to an angle of a crankshaft rotation including at least two engine strokes; and (c) a injection signal means provided for each engine cylinder for producing a fuel injection signal which rises at the time of the calculated start timing and has a duration corresponding to the calculated duration of fuel injection, the fuel injection signal being sent to the corresponding fuel injection valve at any time during the extended time interval from at least the beginning of the suction stroke to the end of the compression stroke of the engine cylinder.

7 Claims, 11 Drawing Figures

FUEL INJECTION CONTROL SYSTEM FOR A DIRECT INJECTION TYPE INTERNAL COMBUSTION ENGINE

BACKGROUND OF THE INVENTION

1. Field of the Invention

The present invention relates to a fuel injection control system for a direct injection type internal combustion engine. The system controls the fuel injection start timing and fuel injection duration to occur any time during an extended time interval from at least the beginning of a suction stroke to the end of a compression stroke to achieve fuel economy at low and middle engine loads and to achieve a high power output characteristic at a high engine load.

2. Description of the Prior Art

The direct injection type internal combustion engine has a construction wherein a given amount of fuel is injected directly into an engine cylinder and the fuel spraying characteristics and air stream within the engine cylinder are precisely controlled to form a region of combustible air-fuel mixture in the vicinity of an ignition plug, thereby facilitating stable combustion of the air-fuel mixture at every mixture ratio the air-fuel mixture.

It is necessary to control the fuel spraying characteristic within each engine cylinder precisely. In addition, it is necessary to control the timing of fuel injection start and fuel injection end (fuel injection duration) more extensively than in a conventional internal combustion engine of the indirect injection type since in the direct injection type internal combustion engine it is difficult to carry out precombustion of the air-fuel mixture which always occurs in a conventional internal combustion engine wherein the fuel is injected into intake manifolds behind intake valves of the engine cylinders.

For example, it is desirable that in a region of low engine load, the end of fuel injection through a fuel injection valve be timed immediately before the spark timing, i.e., at substantially the end of the compression stroke to avoid misfire and that in a region of high engine load, the end of fuel injection be timed at an earlier stage, e.g., at substantially the end of a suction stroke (when the piston arrives at bottom dead center).

However, in conventional fuel injection control systems fuel injection cannot flexibily be carried out over a wide range of times, including the suction and compression strokes of one engine cycle since the conventional fuel injection control systems only inject during the suction stroke of each engine cylinder according to a reference angle pulse produced whenever an engine crankshaft has rotated through 180° (180° in the case of four cylinder engine, 720°÷cylinder number in general), and the conventional control systems cannot inject through more than one fuel injection valve. That is to say the conventional control system cannot overlap the fuel injection through one of the fuel injection valves while any other fuel injection valve is injecting.

Therefore, it is difficult to reduce fuel consumption through combustion of an extremely lean air-fuel mixture under a low engine load, since extensive control of the timing of fuel injection start and fuel injection end (fuel injection duration) cannot be effected with conventional control systems.

SUMMARY OF THE INVENTION

It is an object of the present invention to provide a fuel injection control system which can control the timing of fuel injection start and fuel injection end (fuel injection duration) over a wide time range.

According to the present invention, this and other objects may be achieved by providing a first circuit associated with each engine cylinder for calculating a pulse width for an injection signal, the pulse width determining a fuel injection quantity per injection of each fuel injection valve installed to the first circuit corresponding engine cylinder, and a second circuit for producing and sending to the first circuit a trigger signal having a period greater than the crank angle and including at least the suction stroke and the compression stroke of the corresponding engine cylinder to actuate the second circuit during a predetermined stroke (e.g., during the suction stroke) of each engine cylinder.

BRIEF DESCRIPTION OF THE DRAWINGS

A more complete understanding of the present invention may be obtained from the following detailed description in conjunction with the attached drawings in which like reference numerals designate like elements and in which.

DETAILED DESCRIPTION OF THE PREFERRED EMBODIMENTS

Reference will be made to the drawings in order to facilitate understanding of the present invention.

Figure 1:
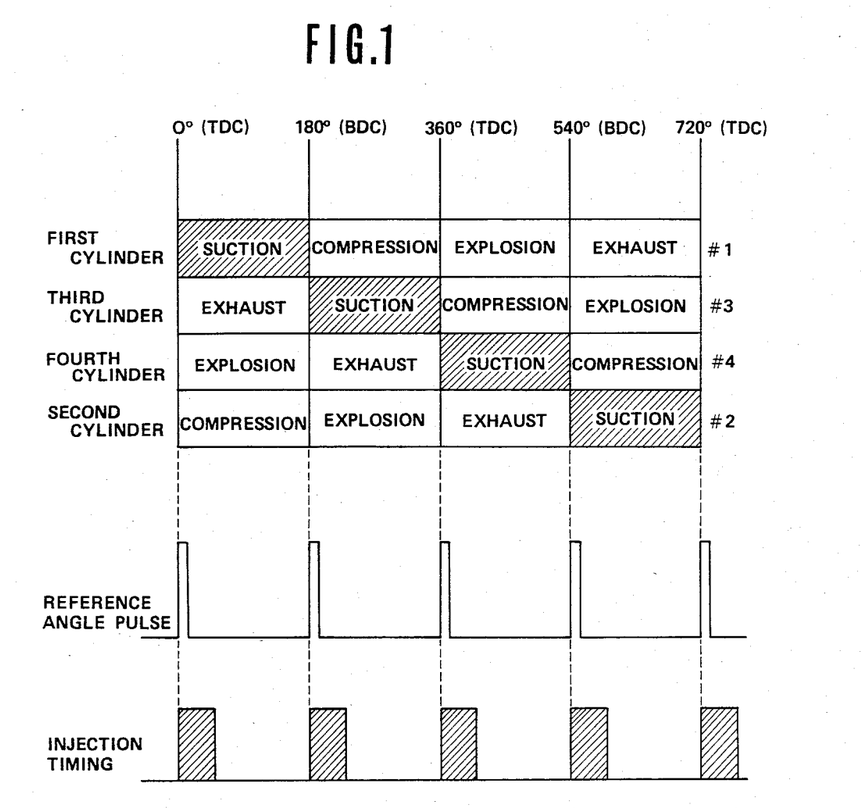
FIG. 1 is a sequential diagram of fuel injection in a conventional fuel injection control system.

FIG. 1 shows a fuel injection sequence for a four-cylinder engine, wherein a conventional fuel injection control system is applied. As shown in FIG. 1, fuel injection is carried out only during the suction stroke of each engine cylinder in synchronization with a reference angle pulse produced whenever the crankshaft rotates through 180° (180° in the case of the four-cylinder engine, 720°÷cylinder number in the case of other multi-cylinder engines). Therefore, such a conventional fuel injection control system cannot simultaneously inject fuel through more than one injection valve where there would be overlapping fuel injection times.

Figure 2:
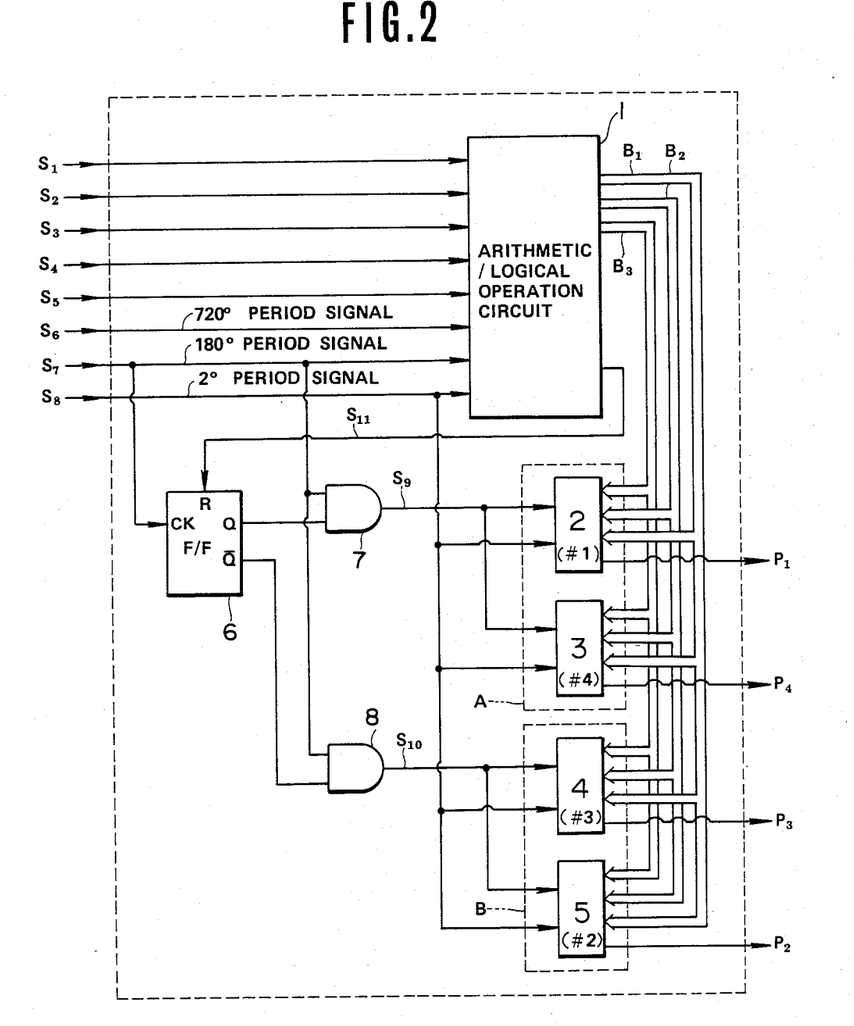
FIG. 2 is a circuit block diagram of a fuel injection control system for a four-cycle four-cylinder engine showing a first preferred embodiment of the present invention.

FIG. 2 shows a fuel injection control system of a first preferred embodiment according to the present invention. In FIG. 2, the arithmetic/logical operation block 1 comprises, e.g., a microprocessor.

Figure 3:
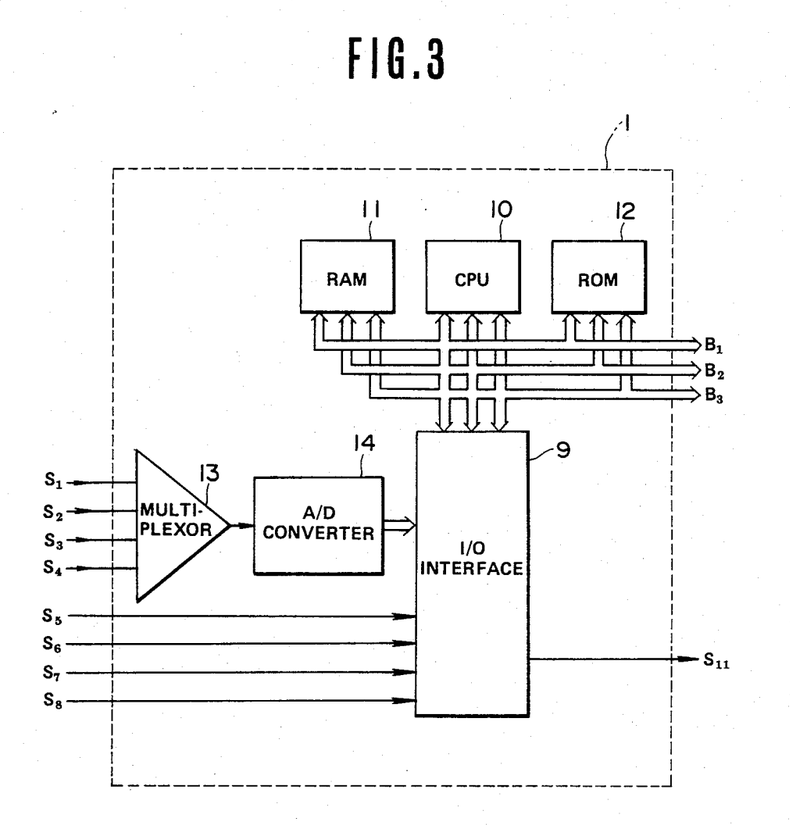
FIG. 3 is a circuit block diagram of a suitable arithmetic/logical unit for use with the system shown in FIG. 2.

FIG. 3 shows a detailed construction of the arithmetic/logical operation unit 1. In FIG. 3, numeral 9 denotes an Input/Output interface, numeral 10 denotes a CPU (Central Processing Unit), numeral 11 denotes a RAM (Random Access Memory), numeral 12 denotes a ROM (Read Only Memory), numeral 13 denotes a multiplexer, and numeral 14 denotes an analog-to-digital converter. Such analog signals as a throttle valve opening signal $S_1$, an intake air quantity signal $S_2$, an engine temperature signal $S_3$, battery voltage signal $S_4$, etc., are transmitted to the analog-to-digital converter 14 sequentially via a multiplexer 13. The arithmetic/logical operation unit 1 (to be described in detail hereinafter) receives various signals $S_1$ through $S_8$ indicating engine driving conditions, calculates a fuel injection start timing and fuel injection time width according to the various engine driving conditions, and controls injection signal arithmetic circuits 2 through 5 provided for each engine cylinder via address bus $B_1$, data bus $B_2$, and control bus $B_3$. Each injection signal arithmetic/logical circuit 2 through 5 (the details of which are described hereinafter preferably) has the same construction. An injection signal $P_1$ through $P_4$ for driving a fuel injection valve (not shown) installed within each engine cylinder is outputted from each corresponding injection signal arithmetic/logical circuit.

A reference angle pulse $S_7$ outputted whenever the crankshaft rotates through a reference angle (180° in the case of four-cylinder engine), a unit angle pulse $S_8$ outputted whenever the crankshaft has rotated through a unit of angle (for example, 1°), and a 720° angle pulse $S_6$ (two engine revolutions) are received from a crank angle sensor (not shown).

Figure 5:
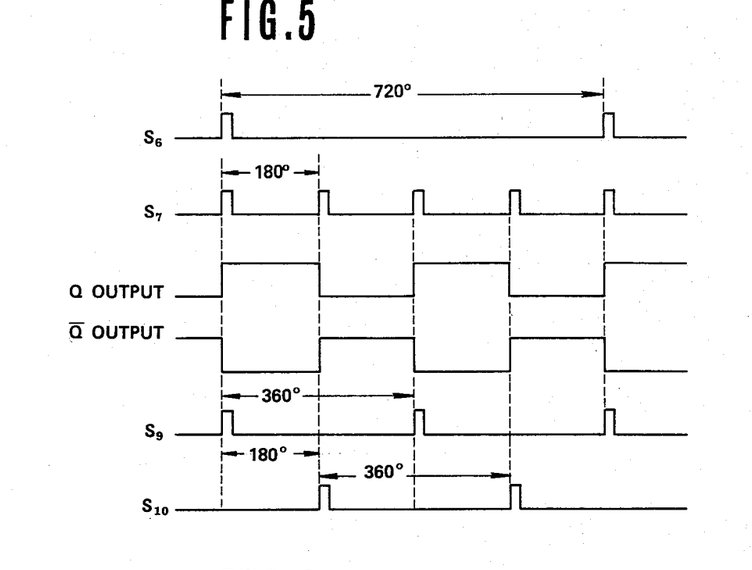
FIG. 5 is a signal waveform chart for the circuit shown in FIG. 2.

It should be noted that flip-flop circuit 6 and AND gate circuits 7 and 8 are circuits for dividing the reference angle pulse $S_7$ by two. The flip-flop circuit 6 outputs a signal whose logical levels are inverted whenever the reference angle pulse $S_7$ is received at a clock terminal thereof. (For the signal waveform, refer to FIG. 5). The AND gate circuit 7 outputs a signal $S_9$ of a logical product between a Q output of the flip-flop circuit 6 and reference angle pulse $S_7$. The other AND gate circuit 8 outputs a signal $S_{10}$ of a logical product between a $\overline{Q}$ output of the flip-flop circuit 6 and reference angle pulse $S_7$. Hence, each of the signals $S_9$ and $S_{10}$ has a period of 360° crankshaft rotation and the signals $S_9$ and $S_{10}$ have a phase difference of 180° crankshaft rotation. Signal $S_9$ is sent to two injection signal arithmetic/logical circuits 2 and 3, and signal $S_{10}$ is sent to the remaining two injection signal arithmetic/logical circuits 4 and 5. An On-and Off signal $S_5$, such as a starter switch signal for driving a starter motor, and pulse train signals such as 720° pulse signal $S_6$, reference angle pulse signal $S_7$ and unit angle pulse $S_8$ are sent directly into the I/O interface 9.

Figure 8:
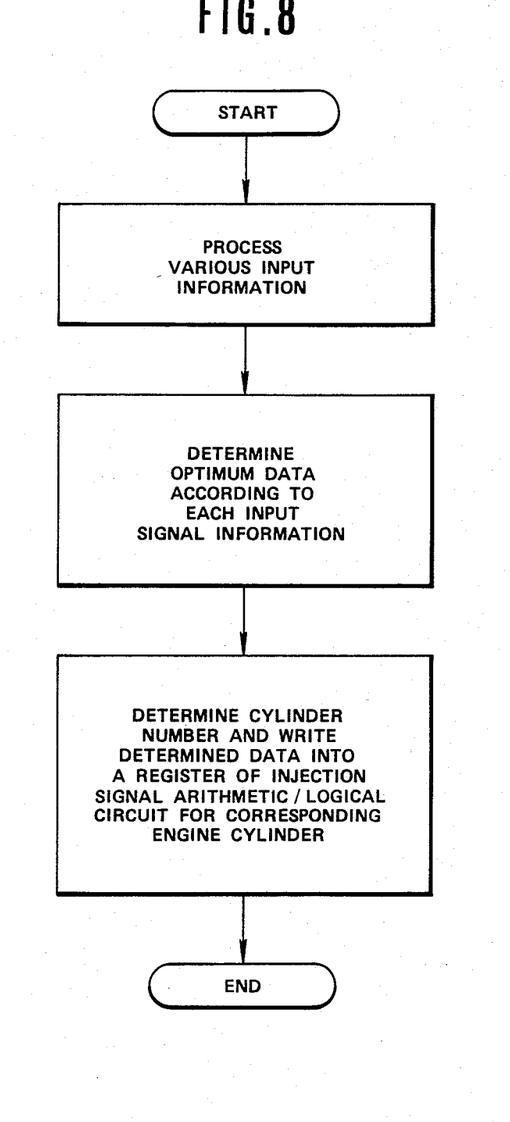
FIG. 8 is an example of an arithmetic operation flowchart.

The CPU 10 executes an arithmetic operation shown in FIG. 8 in accordance with a fuel injection program routine stored in the ROM 12. In other words, the current engine driving condition is determined from data received by the input signals $S_1$ through $S_8$, and the optimum fuel injection end timing and fuel injection time width (fuel injection quantity) are retrieved from characteristic data previously stored in the ROM 12. The characteristic data is obtained from a load amount (throttle opening or intake air quantity) and a rotational speed (calculated from the unit angle pulse $S_8$). Correction factors such as engine temperature and battery voltage may be added to the value obtained from the aforementioned characteristic data.

The fuel injection start timing is determined from the fuel injection end timing and the fuel injection time width. Thereafter, the cylinder to subsequently inject fuel is determined from the 720° pulse signal $S_6$ (a signal which indicates the timing of a particular engine cylinder, e.g., first engine cylinder being in the suction stroke) and the reference angle pulse $S_7$. At this time, data on the timing of the fuel injection start and injection time width are read into a register (the details of which are to be described hereinafter) of the injection signal arithmetic/logical operation circuits (any one of 2 through 5 in FIG. 2) for the corresponding engine cylinder.

Figure 4:
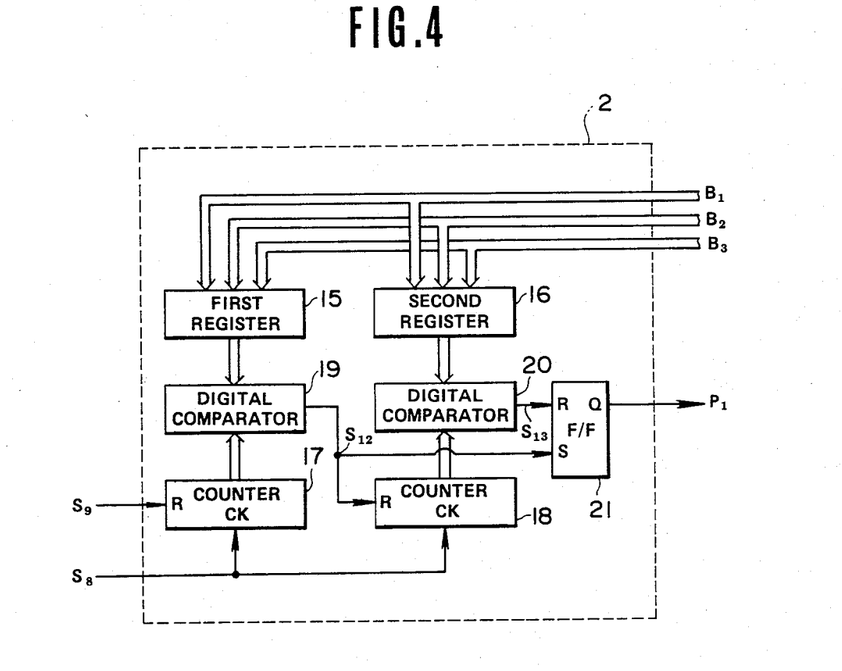
FIG. 4 is a circuit block diagram of an example circuit for calculating a pulse width of an injection signal.
Figure 6:
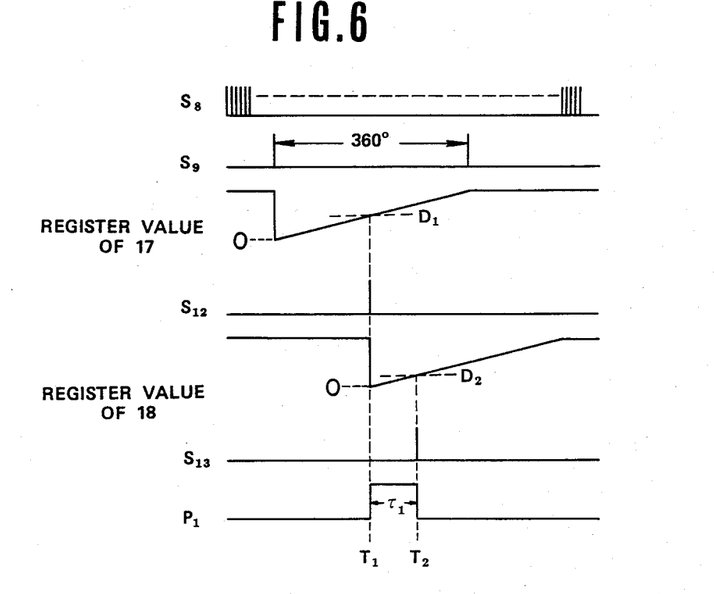
FIG. 6 is a signal waveform chart for the circuit shown in FIG. 4.
Figure 7:
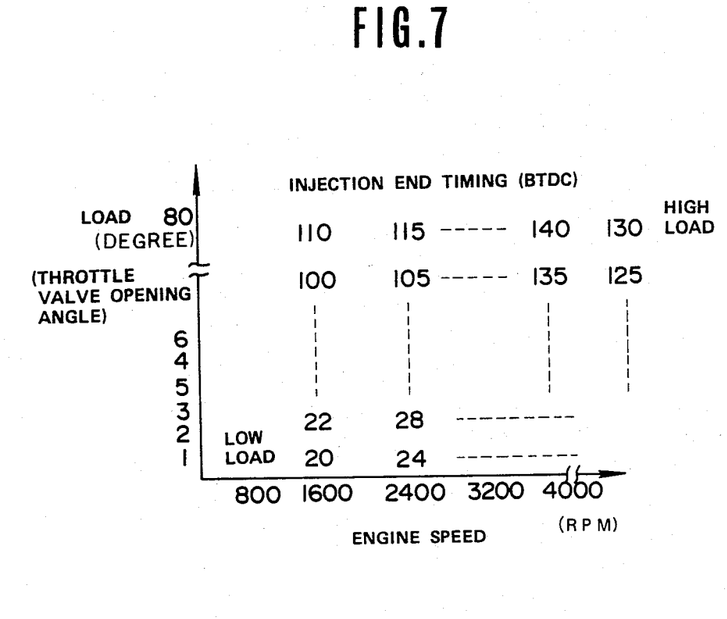
FIG. 7 is an example of characteristic data on fuel injection end timing and fuel injection time width.

The fuel injection signal arithmetic/logical circuits 2 through 5 are described as follows:

FIG. 4 shows the internal circuit configuration of fuel injection signal arithmetic/logical circuit 2 (the remaining fuel injection signal arithmetic circuits 3 through 5 are the same as 2). FIG. 6 shows a signal waveform timing chart for the internal circuit shown in FIG. 4.

In FIG. 4, numeral 15 denotes a first register in which data on the fuel injection start timing is written, numeral 16 denotes a second register in which data on the fuel injection time width is written, numerals 17 and 18 denote counters, numerals 19 and 20 denote comparators, and numeral 21 denotes a flip-flop circuit.

The fuel injection signal arithmetic/logical circuit 2 is operated in the following order. The data on the fuel injection start timing and injection time width is written into the first and second registers 15 and 16 via various buses $B_1$ through $B_3$. Thereafter, the counter 17 counts the unit angle pulse $S_8$ and is reset when the above-described signal $S_9$ is received. The comparator 19 outputs a signal $S_{12}$ when the values read by the counter 17 and read by the first register 15 are compared and these values coincide with each other (in FIG. 6 the value of the second register 16 is denoted by $D_1$. The counter 18 counts the unit angle pulse $S_8$ and is reset in response to the signal $S_{12}$ as appreciated from FIG. 4. The comparator 20 compares the values of the counter 18 and register 16 (in FIG. 6, denoted by $D_2$) and outputs the signal $S_{13}$ when these values coincide with each other. The flip-flop circuit 21 is set by the signal $S_{12}$ and reset by the signal $S_{13}$.

Therefore, the injection signal $P_1$ for the first cylinder, i.e., the Q output of the flip-flop circuit 21, is a pulse signal which rises at the fuel injection start timing $T_1$ written into the first register 15 as shown in FIG. 6 and falls after the injection time width $\tau_1$ written into the second register 16. The fuel injection end is timed when the pulse signal falls at time of $T_2$. A fuel injection can be made at the desired fuel injection start timing, and fuel injection end timing fuel injection time width (duration) by opening the corresponding fuel injection valve while the injection signal $P_1$ is at a high level.

Figure 9:
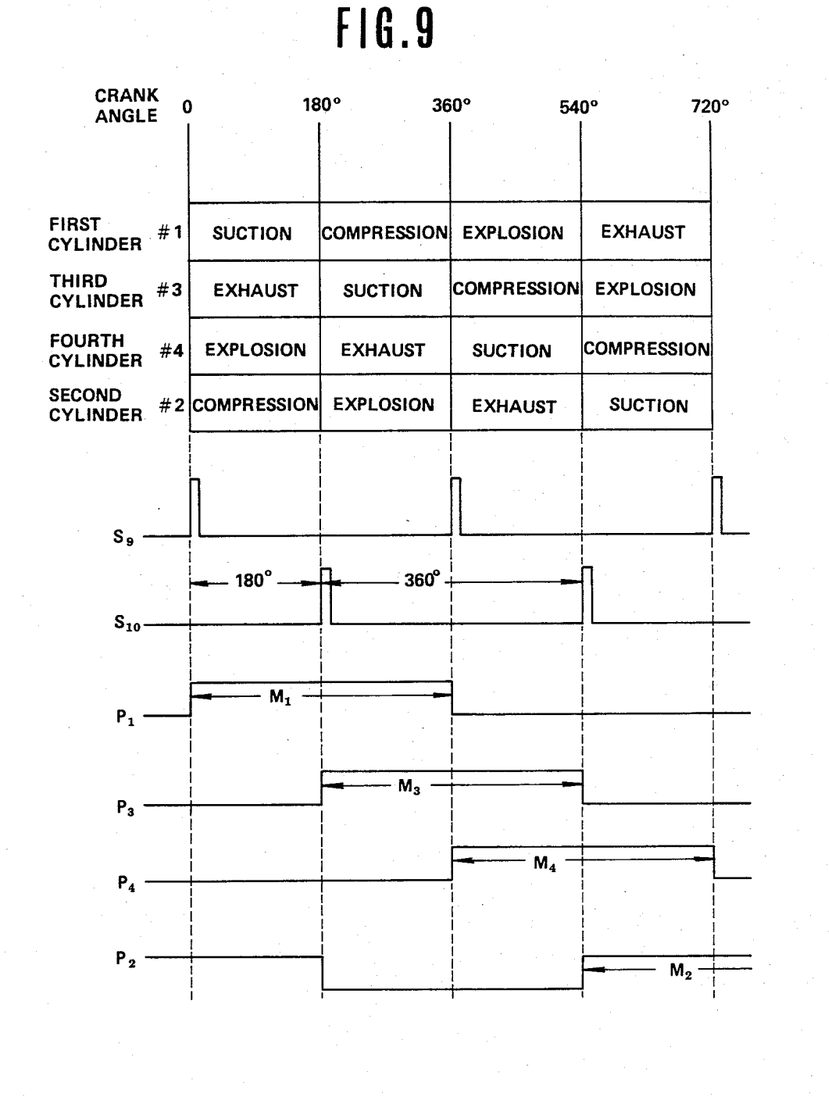
FIG. 9 is a sequential diagram of fuel injection for the fuel injection control system shown in FIG. 2.

FIG. 9 shows a fuel injection sequence diagram in which the fuel injection is carried out in the order of first, third, fourth, and second engine cylinders. As shown in FIG. 9, combinations of engine cylinders in which the start of the suction strokes are spaced by a 360° interval from each other are the first and fourth cylinders and the third and second cylinders. Therefore, the engine cylinders are divided into two blocks; the first and fourth cylinders being a first block A and the third and second cylinders being a second block B (see FIG. 2). The signal $S_9$ is sent to the first block A. The signal $S_{10}$ is sent to the second block B. In the injection signal arithmetic/logical circuits 2 through 5, the injection signal arithmetic/logical circuit 2 is associated with the first engine cylinder; the injection signal arithmetic circuit 3 is associated with the fourth engine cylinder; the injection signal arithmetic circuit 4 is associated with the third engine cylinder, and the injection signal arithmetic/logical circuit 5 is associated with the second engine cylinder.

As described hereinabove, since each of the signals $S_9$ and $S_{10}$ has a period of 360° of crankshaft rotation and an 180° difference in phase. Therefore, the signals $S_9$ and $S_{10}$ are sent to the blocks A and B at the first stage of the suction stroke and at the end stage of the compression stroke of each engine cylinder.

In the above-described configuration, the flip-flop circuit 6 is reset in response to the signal $S_{11}$ from the I/O interface 9 when the 720° pulse signal $S_6$ is received, and the data for the first engine cylinder into which the fuel is to be injected, for example cylinder number 1 is stored in the RAM.

When the reference angle pulse $S_7$ is received, the CPU 10 determines the fuel injection start timing and injection time width in the aforementioned order, and the results are transferred to the two registers (15 and 16 in FIG. 4) of the injection signal arithmetic circuit 2 for the first engine cylinder. At this time, a message data that the next engine cylinder into which the fuel is to be injected is the third engine cylinder, is sent into RAM 11.

The fuel injection signal arithmetic/logical circuit 2 outputs the injection signal $P_1$ having the fuel injection start timing and injection time width corresponding to the values written into the registers 15 and 16 by means of the signal $S_9$ provided at the beginning of the suction stroke and the unit angle pulse $S_8$ so that the fuel injection valve within the first engine cylinder is properly triggered to carry out the fuel injection.

The signal $S_{10}$ is sent to the fuel injection arithmetic/logical circuit 4 for the third engine cylinder 180° later than the signal $S_9$ to enable the fuel injection valve within the third engine cylinder carries out fuel injection. At this time the value of the registers in the fuel injection signal arithmetic circuit 2 is changed so that further fuel injection cannot be carried out.

In the same way, a sequential fuel injection can be carried out in the order of first, third, fourth, and second engine cylinders. The same signal $S_9$ is sent into the fuel injection signal arithmetic circuits 2 and 3 of the first and fourth engine cylinders. The same signal $S_{10}$ is sent into the fuel injection signal arithmetic circuits 4 and 5 of the third and second engine cylinders. The numerical values transferred to the registers 15 and 16 comprises message data associated with the engine cylinder to be subjected to the fuel injection. The predetermined arithmetic operation is executed at the fuel injection signal arithmetic circuit to which the signal $S_9$ or $S_{10}$ is transmitted. The registers will not malfunction because when the fuel injection signal arithmetic/logical circuit for one of the cylinders receives numerical data on the fuel injection start timing and fuel injection duration, the register contents in the other fuel injection signal arithmetic/logical circuits are changed to values which prevent fuel injection even though they may receive the same signal $S_9$ or $S_{10}$ as circuit for the injecting fuel into the next cylinder.

It will be appreciated from FIG. 9 that the signal $S_9$ or $S_{10}$, which triggers one of the fuel injection arithmetic/logical circuits, has a period of 360° in terms of the crankshaft rotation. A maximum time width $M_1$ through $M_4$ of any of the injection signals $P_1$ through $P_4$ indicates 360° of the crank angle. In other words, the fuel injection control can be performed over a maximum range of 360° of the crank angle which includes the suction and compression strokes.

The preferred embodiment shown in FIG. 2 can be applied to the four-cylinder engine. It can also be applied equally well to an engine having any other number of cylinders. For example, in the case of a six-cylinder engine, the fuel injection order is first, fifth, third, sixth, second, and fourth. Six fuel injection signal arithmetic/logical circuits are divided into three blocks. In addition, the reference angle pulse is divided into three to produce three different pulse signals each having a period of 360° and being shifted by 120° with respect to the other pulse signals. These three pulse signals are transmitted to the respective three blocks.

In general, assuming that the number of engine cylinders is N, the engine cylinders are divided into N/2 blocks and N/2 signals are produced having a period of 360° by dividing the reference angle pulse by N/2. The phase difference between signals will correspond to the period of the reference angle pulse. The signals produced in this way are sent in their respective blocks.

Actual suction of intake air often starts before a top dead center of a suction stroke, i.e., during the exhaust stroke. This is called a valve overlap. Therefore, the first stage of the suction stroke may correspond to the position of top dead center or it may correspond to the actual suction start timing in consideration of the valve overlap. An aribitary injection is possible over the 360° range from the top dead center position or the actual start timing of the suction stroke. The start timing can aribitarily be set depending on the position at which the reference angle pulse $S_7$ is produced, i.e., depending on the construction of the crank angle sensor. Furthermore, the reference angle pulse signal needs to have a period of more than 360° of crank angle (420° if the intake valve overlap angle is 60°) to perform an aribitary fuel injection over the whole range of strokes including suction and compression strokes.

Figure 10:
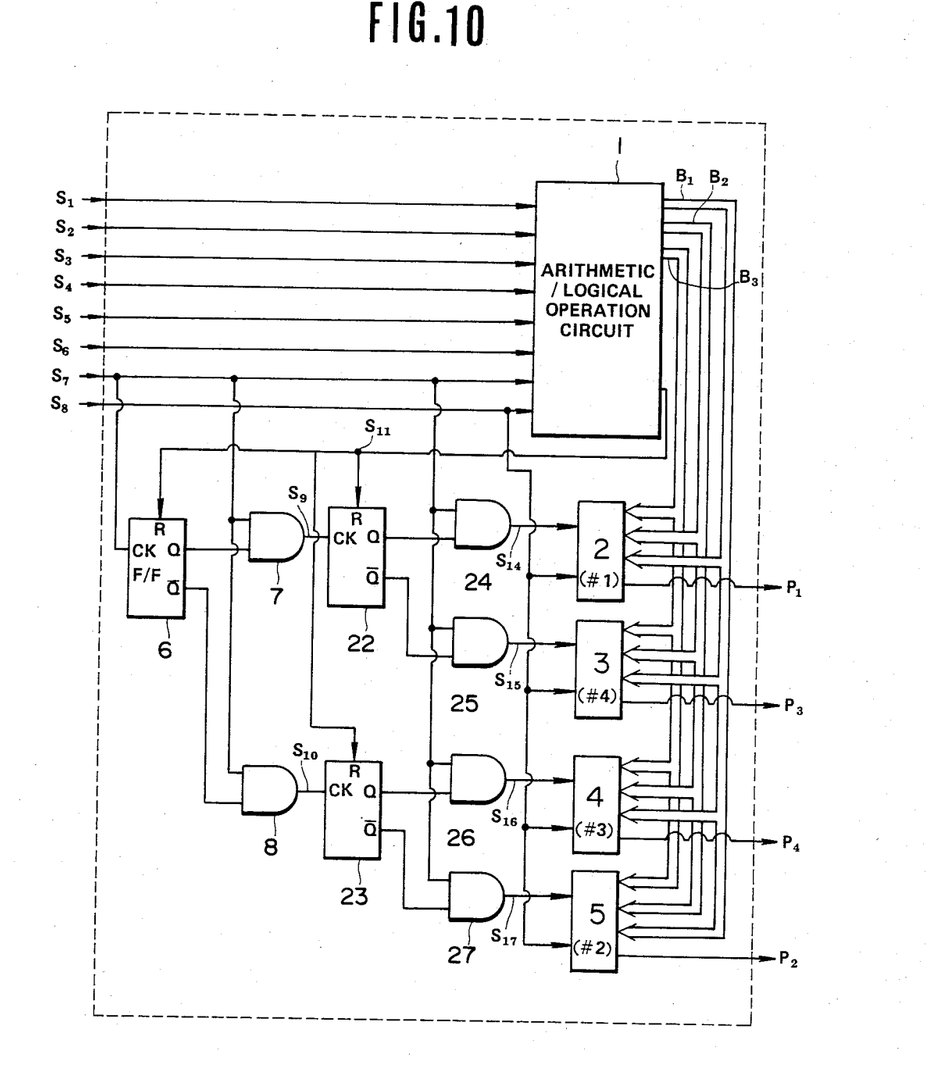
FIG. 10 is a circuit diagram of a fuel injection control system showing a second preferred embodiment of the present invention.
Figure 11:
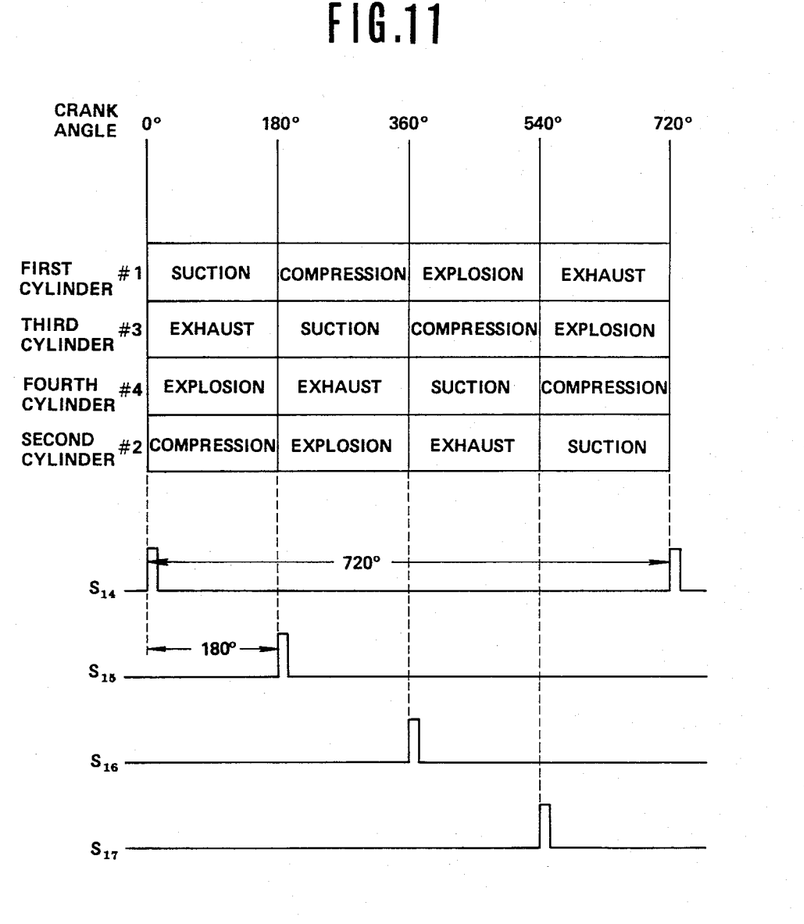
FIG. 11 is a sequential diagram for the fuel injection control system shown in FIG. 10.

FIG. 10 shows a second preferred embodiment which carries out the fuel injection control in consideration of the valve overlap. In the circuit shown in FIG. 10 two flip-flop circuits 22 and 23 and AND gate circuits 24 through 27 are added whereby the signals $S_9$ and $S_{10}$ are further divided in two so that four signals $S_{14}$ through $S_{17}$ are produced each having a period of 720° and being 180° out of phrase with each other. These four signals are transmitted to the injection signal arithmetic/logical circuits 2 through 5, respectively. In this embodiment, the signals $S_{14}$ through $S_{17}$ for triggering the fuel injection signal arithmetic/logical circuit of each engine cylinder have a period of 720°. Therefore, fuel injection is possible at any given position over the whole engine stroke, i.e., 720° at each engine cylinder.

In general, N signals (the symbol N denotes the number of engine cylinders) are produced each having a period of 720° and a phase difference of 720°/N with respect to one another. The N injection signal arithmetic/logical circuits corresponding to each engine cylinder may be triggered by each signal.

It should be noted that the flip-flop circuits 6, 22, and 23 are reset by the reset signal $S_{11}$ whenever the engine rotates 720° in order to recover a normal state after the end of one cycle if the injection sequence goes out of order due to noise disturbance in the reference angle pulse signal $S_7$.

According to the present invention as described hereinabove, control of the fuel injection starting period, the fuel injection ending period, and the injection time width can aribitarily be made over a wide range of engine stroke including at least the suction and compression strokes, the fuel injection valves within a plurality of engine cylinders can be actuated in a timely overlapping state. During low engine load, therefore, the end of fuel injection may approach an actual spark timing so that combustion of an extremely lean air-fuel mixture can be achieved to remarkably improve the fuel economy. During high engine load, the end of fuel injection may be timed earlier to provide substantial precombustion of the air-fuel mixture. Consequently, the engine produces a higher power output than is usually possible with a direct injection type internal combustion engine.

It will be fully understood by those skilled in the art that modifications may be made in the preferred embodiments described above without departing from the spirit and scope of the present invention, which is to be defined by the appended claims.

What is claimed is:

1. A fuel injection control system for a direct injection type, multi-cylinder, internal combustion engine having a crankshaft, comprising:
   (a) a plurality of fuel injection valves, respectively disposed in a combustion chamber of each cylinder of said engine through which an amount of fuel is directly injected into the combustion chamber in response to an associated timed injection signal having a pulse width, the amount of fuel injected varying in accordance with said pulse width;
   (b) means for calculating the start timing and pulse width of the injection signal for each fuel injection valve according to current engine operating conditions;
   (c) means for producing a plurality of pulse signals, each corresponding to one of said cylinders and having a period extending through a predetermined angle of crankshaft rotation, said period including at least a suction and a compression stroke of the corresponding cylinder and a timing corresponding to a predetermined stroke of said cylinder; and
   (d) injection signal producing means associated with each engine cylinder and responsive to said pulse signals for producing and outputting said injection signals based on data calculated by said calculating means and synchronized with said pulse signals, whereby each fuel injection has a duration corresponding to said calculated pulse width and occurs over a period which includes at least the suction and compression strokes of the corresponding cylinder.

2. A fuel injection control system as set forth in claim 1, wherein said pulse signal producing means comprises a frequency dividing circuit which receives a reference angle pulse produced whenever the engine rotates through a given reference angle, the value of which is obtained by dividing an angle corresponding to two engine revolutions by a number N corresponding to the number of engine cylinders, and divides said reference angle pulse frequency by two for producing one of said pulse signals, the number of said pulse signals being equal to half the number of engine cylinders, each of said pulse signals having a period corresponding to an angle through which the engine crankshaft rotates during one engine revolution and a phase difference from any other pulse signal corresponding to an angle through which the engine crankshaft rotates during two engine revolutions divided by N.

3. A fuel injection control system as set forth in claim 2, wherein said injection signal producing means are divided into groups, the number of which is obtained by dividing the number N by two, said groups corresponding to pairs of engine cylinders which have associated pulse signals with a phase difference from other pulse signals which correspond to the reference angle, said pulse signals being individually fed to said respective groups.

4. A fuel injection control system as set forth in claim 1, wherein said pulse signal producing means comprises a frequency dividing circuit which receives a reference angle pulse produced whenever the engine rotates through a given reference angle, the value of which is obtained by dividing a rotational angle corresponding to two engine revolutions by the number of engine cylinders, and divides said reference angle pulse by the number of engine cylinders for producing said pulse signals, said pulse signals being equal in number to the number of engine cylinders and having a period corresponding to an angle through which the engine crankshaft rotates during two engine revolutions and a phase difference from each other corresponding to the angle of two engine revolutions divided by the number of engine cylinders, and wherein each of said injection signal producing means is fed a corresponding one of said pulse signals.

5. A fuel injection control system as set forth in claim 3, wherein each of said injection signal producing means comprises:
   (a) a first register for temporarily storing fuel injection start timing data transmitted from said calculating means;
   (b) a second register for temporarily storing fuel injection pulse width data from said calculating means;
   (c) a first counter for counting a number of unit angle pulses produced whenever the engine rotates through a unit of angle, said first counter being reset whenever said pulse signal is received;
   (d) a first comparator for comparing data stored in said first register with a count value in said first counter and for outputting a first signal when said stored data and count value coincide;
   (e) a second counter for counting a number of said unit angle pulses, said second counter being reset responsive to said first signal;
   (f) a second comparator for comparing data stored in said second register with the count value in said second counter and for outputting a second signal when said data stored in said second register and second counter value coincide;
   (g) a flip-flop circuit which is set by said first signal and reset by said second signal so that a Q output terminal thereof outputs the injection signal having a start timing determined by the fuel injection start timing data stored in said first register and a pulse width corresponding to the fuel injection pulse width data stored in said second register.

6. A fuel injection control system as set forth in claim 1, wherein under low engine load conditions said start timing and pulse width of the fuel injection signal are calculated whereby the end of said fuel injection signal approaches the end of the compression stroke.

7. A fuel injection control system as set forth in claim 1, wherein under high engine load conditions the start timing and pulse width of the fuel injection signal are calculated whereby the end timing of the fuel injection signal approaches the start of the compression stroke.

* * * * *